United States Patent [19]

Takayama

[11] Patent Number: 5,501,183
[45] Date of Patent: Mar. 26, 1996

[54] TEMPERATURE SENSITIVE FLUID FAN COUPLING

[75] Inventor: Kenichi Takayama, Mishima, Japan

[73] Assignee: Usui Kokusai Sangyo Kaisha Ltd., Japan

[21] Appl. No.: 338,881

[22] Filed: Nov. 10, 1994

[30] Foreign Application Priority Data

Nov. 17, 1993 [JP] Japan .................................. 5-311222
Jan. 27, 1994 [JP] Japan .................................. 6-024794

[51] Int. Cl.$^6$ ........................................................ F01P 7/02
[52] U.S. Cl. ..................... 123/41.12; 192/82 T; 192/58.3
[58] Field of Search ....................... 123/41.12; 192/58 B, 192/82 T

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,174,600 | 3/1965 | Oldberg | 192/58 B |
| 3,217,849 | 11/1965 | Weir | 192/82 T |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,642,105 | 2/1972 | Kikuchi | 192/58 B |
| 3,727,735 | 4/1973 | La Flame | 192/58 B |
| 3,840,101 | 10/1974 | Peter et al. | 192/58 B |
| 3,856,122 | 12/1974 | Leichliter | 192/58 B |
| 3,893,555 | 7/1975 | Elmer | 123/41.12 |
| 3,964,582 | 6/1976 | Mitchell | 192/58 B |
| 3,972,399 | 8/1976 | Bopp | 192/58 B |
| 4,238,016 | 12/1980 | Yoshida et al. | 192/58 B |
| 4,281,750 | 8/1981 | Clancey | 192/58 B |
| 4,403,684 | 9/1983 | Haeck | 192/58 B |
| 4,485,902 | 12/1984 | Storz | 192/58 B |
| 4,505,367 | 3/1985 | Martin | 192/58 B |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,784,247 | 11/1988 | Nakamura | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |
| 5,004,085 | 4/1991 | Taureg | 192/58 B |
| 5,018,612 | 5/1991 | Takikawa et al. | 192/58 B |
| 5,090,533 | 2/1992 | Inoue | 192/58 B |
| 5,101,949 | 4/1992 | Takikawa et al. | 192/58 B |
| 5,109,965 | 5/1992 | Inoue | 192/58 B |
| 5,119,920 | 6/1992 | Inoue | 192/58 B |
| 5,125,491 | 6/1992 | Takikawa et al. | 192/58 B |
| 5,139,125 | 8/1992 | Takikawa et al. | 192/58 B |
| 5,232,074 | 8/1993 | Watanabe | 192/58 B |

FOREIGN PATENT DOCUMENTS

| | | | |
|---|---|---|---|
| 54-25581 | 8/1979 | Japan . | |
| 55-76226 | 6/1980 | Japan . | |
| 57-1829 | 1/1982 | Japan . | 192/82 T |
| 57-167533 | 10/1982 | Japan . | |
| 57-179431 | 11/1982 | Japan . | |
| 59-27452 | 7/1984 | Japan . | |
| 62-124330 | 6/1987 | Japan . | |
| 62-194038 | 8/1987 | Japan . | 192/58 B |
| 63-182332 | 11/1988 | Japan . | |

*Primary Examiner*—Noah P. Kamen
*Attorney, Agent, or Firm*—Anthony J. Casella; Gerald E. Hespos

[57] ABSTRACT

A driving disc in a temperature-sensitive fluid fan coupling has a substantially C- or I-shaped cross section defined by a cylindrical wall projecting from its outer periphery coaxially therewith. The disc has at its outer periphery including the projecting wall a width which is equal to at least 7% of its outside diameter. The disc, its projecting wall and a housing in which the disc is mounted define at least one chamber for the temporary storage of oil. The disc has on at least one side thereof a plurality of radially extending partitions which divide the oil storage chamber into a plurality of portions.

18 Claims, 21 Drawing Sheets

FIG. I

ℓ = WIDTH OF DRIVING DISK
D = OUTSIDE DIAMETER OF DRIVING DISK 5,501,183

TEMPERATURE SENSITIVE FLUID FAN COUPLING

BACKGROUND OF THE INVENTION

1. Field of the Invention

This invention relates to a temperature-sensitive fluid fan coupling which controls the rotation of a fan for cooling an automobile engine to ensure that the supply of cooling air to the engine be controlled in accordance with the mode of its operation.

2. Description of the Prior Art

A known fan coupling of the type to which this invention pertains is constructed as shown in, for example, FIG. 35 of the accompanying drawings. It includes a driving disc 27 secured to a rotary shaft, having a thick portion 27-1 along its outer edge, and enclosed in a torque transfer chamber 24 in such a way that a torque transfer gap may be left between the disc 27 and the inner wall surface of a closed housing defining the torque transfer chamber 24. A partition 25 divides the interior of the closed housing into the torque transfer chamber 24 and an oil reservoir 26.

The thick portion 27-1 of the driving disc 27 is intended to provide an improved force for torque transfer and an improved pumping action by a dam not shown. The oil in the torque transfer chamber 24, however, causes the "accompanying rotation" of the fan as shown by a curve β in FIG. 31 or 32, when the engine is restarted from its stop position, or is rapidly accelerated from its low to its high input operation during the travel of the vehicle. The "accompanying rotation" of the fan means a sharp increase of its rotation, which produces an abnormally large noise, and also disables the warming up of the engine in the cold season.

The amount of oil in the torque transfer chamber is equal to the amount of oil which is supplied from the oil reservoir to the torque transfer chamber through a flow control hole made in the partition, minus the amount of oil which is collected from the torque transfer chamber by the dam. The fan, however, continues rotating without lowering its speed for some time after the flow control hole is closed as a result of a drop in ambient temperature to discontinue the supply of oil from the oil reservoir to the torque transfer chamber. This is due to the fact that the dam has so small a power of collecting oil from the torque transfer chamber that there is a time lag before the amount of oil in the torque transfer chamber is so reduced that the transfer of torque is discontinued.

The oil collecting power of the dam increases in proportion to the difference between the speeds of input and output rotation (or the relative speed of rotation). If the speed of input rotation is low, therefore, the power is relatively small, particularly during the beginning of operation at a low temperature. Thus, the fan keeps a high rotating speed owing to its "accompanying rotation" as shown at β in FIG. 31, and there occurs a large hysteresis or lag in the operation of the dam due to a delay in temperature elevation or drop. If there is a large hysteresis, the dam has only a small power of collecting oil from the torque transfer chamber, and the oil remaining in the torque transfer chamber causes the "accompanying rotation" of the fan.

The thick portion 27-1 of the driving disc 27 prevents its preparation by pressing, and makes it imperative to rely upon cutting from a casting having a correspondingly large thickness. This process is less efficient and makes the disc, and thereby the whole device, more expensive. Moreover, the thick portion 27-1 adds to the weight of the disc and thereby of the whole device.

SUMMARY OF THE INVENTION

Under these circumstances, it is an object of this invention to provide a temperature-sensitive fluid fan coupling which can effectively restrain the "accompanying rotation" of a fan without lowering its force for torque transfer when the engine is restarted from its stop position, or is rapidly accelerated to its high input position during the travel of the vehicle, so that the fan may rotate at a speed which is appropriately correlated to the ambient temperature.

This object is attained by a device which comprises a rotary shaft. A casing is supported by a bearing on the shaft and is adapted for mounting a cooling fan on its outer periphery. A cover closes the casing so that the casing and cover may define a closed housing. A driving disc is secured at its inner periphery to the rotary shaft at one end thereof within the casing. A partition having an oil flow control hole divides the interior of the housing into an oil reservoir and a torque transfer chamber in which the driving disc is disposed. The housing defines at least one dam facing the outer periphery of the driving disc where oil is centrifugally collected. An oil circulating passage is connected to the dam and extends from the torque transfer chamber to the oil reservoir. A temperature sensor is provided on the outside of the cover for detecting the ambient temperature prevailing around the device, and a valve member situated in the oil reservoir, and is operationally connected to the temperature sensor. One end of the valve member is positioned to close the oil flow control hole. The valve member is deformable to open the hole if the temperature detected by the sensor exceeds a predetermined level, so that a torque transfer gap defined between the mutually facing surfaces of the disc and housing may have a different area of effective contact with oil to control the transfer of torque from the rotary shaft to the housing to be thereby driven. The driving disc has a cylindrical wall projecting in at least one axial direction at its outer periphery. The disc, its cylindrical wall and the housing define at least one oil storage chamber.

According to one aspect of this invention, the cylindrical wall projects in one axial direction from the disc to give it a substantially C-shaped cross section along its radius, and defines one oil storage chamber with the disc and housing.

According to another aspect of this invention, the cylindrical wall projects in two opposite axial directions from the disc to give it a substantially I-shaped cross section along its radius, and defines two oil storage chambers with the disc and housing.

The projecting wall preferably has a width which is equal to at least 7% of the diameter of the disc. The projecting wall preferably has a free end provided with an annular projection, while the housing has an inner surface facing the free end of the projecting wall and provided with an annular groove in which the annular projection is loosely fitted, or vice versa. The housing preferably has two axially spaced annular projections spaced apart from the projecting wall of the disc by a very small clearance.

The projecting wall of the driving disc has a sufficiently large width to cover the whole dam. The or each oil storage chamber is preferably divided into a plurality of portions by a plurality of radially extending partitions on the disc. The disc preferably has a plurality of holes each formed between two adjoining partitions and near the radially inner ends thereof.

The projecting wall of the driving disc is preferably provided with a radially inwardly projecting annular rib or ribs. The disc preferably has a plurality of holes formed in at least one of its principal wall, projecting wall, and annular rib or ribs. The holes of the rib or ribs may be replaced by slits.

When the engine is out of operation, only a small amount of oil remains in the torque transfer gap, since oil leaves the torque transfer chamber and is collected in the oil storage chamber, or some divided portions thereof. If the engine is placed in operation, oil is gradually supplied little by little from some divided portions of the oil storage chamber to the torque transfer chamber through the small clearances. The projecting wall of the disc has a width which is preferably at least 7% of its diameter, as compared with the corresponding disc thickness which has been 5% or less in the conventional device. Therefore, the dam has an increased width and thereby exhibits an improved pumping action for collecting oil, so that there may only be a small hysteresis caused by varying temperatures (the "accompanying rotation" of the fan which would result from the sudden acceleration of the engine is effectively restrained particularly when the fan is rotated at a low input). When it is rotated at a low input, the disc has a low speed of rotation and exerts such a small centrifugal force on the oil in the oil storage chamber, or some divided portions thereof that oil does not easily pass through the small clearances, but causes the level of oil in the torque transfer gap to drop.

This means an increase in the speed of relative rotation between the driving disc and the closed housing (or the slip rotation therebetween) and thereby an improved power of collecting oil. The application of a high input for rotation creates a large centrifugal force acting on the oil in the oil storage chamber to cause it to gradually flow out through the clearances to raise the level of the oil in the torque transfer gap and eventually increase the rotating speed of the fan. If the input for rotation is sharply increased from a low level in the vicinity of 1000 rpm at a moderate temperature of about 80° C. when there is a low speed of relative rotation (i.e. in the function of the dam) due to the use of highly viscous oil, or a low torque fan, it is possible to maintain operation with a minimum amount of oil after the collection of a part of the oil in the oil storage chamber. This causes a drop in the level of oil in the torque transfer gap, as shown at a in FIGS. 31 and 32. It is, thus, possible to reduce the hysteresis, as shown in FIG. 33(A). In either event, it is possible to effectively restrain the "accompanying rotation" of the fan.

If the disc is of the type having a plurality of radially extending partitions dividing the oil storage chamber into a plurality of portions, a part of oil flows back from the torque transfer chamber through the holes of the disc to many divided portions of the oil storage chamber that contain little if any oil. However the greater part of the oil in the torque transfer chamber is forced by the dam into a discharge passage.

The radially extending partitions are also useful for promoting the dissipation of heat from the torque transfer surface of the driving disc by conducting it to the rotary shaft, as the disc is heated by oil having an elevated temperature.

The annular rib or ribs make it possible to restrain the "accompanying rotation" of the fan still more effectively, since the rib or ribs serve as a kind of dam for holding oil in the oil storage chamber, or some divided portions to reduce the amount of oil flowing into the torque transfer gap until oil overflows the rib or ribs. The oil held in the oil storage chamber, or some divided portions thereof is allowed to gradually flow out through the holes, or slits of the disc, or its projecting wall, or annular rib or ribs, if any, and is rapidly forced by the dam into the discharge passage.

As its "accompanying rotation" can be effectively restrained, the fan does not produce any abnormal noise, or overcool the engine in the cold season. The driving disc having a substantially C- or I-shaped cross section is simple in shape and is, therefore, easy to manufacture by, for example, pressing from a plate. It and therefore the device as a whole are inexpensive and light in weight.

Other features and advantages of this invention will become apparent from the following description and the accompanying drawings.

DETAILED DESCRIPTION OF THE PREFERRED EMBODIMENTS

Figure 1:
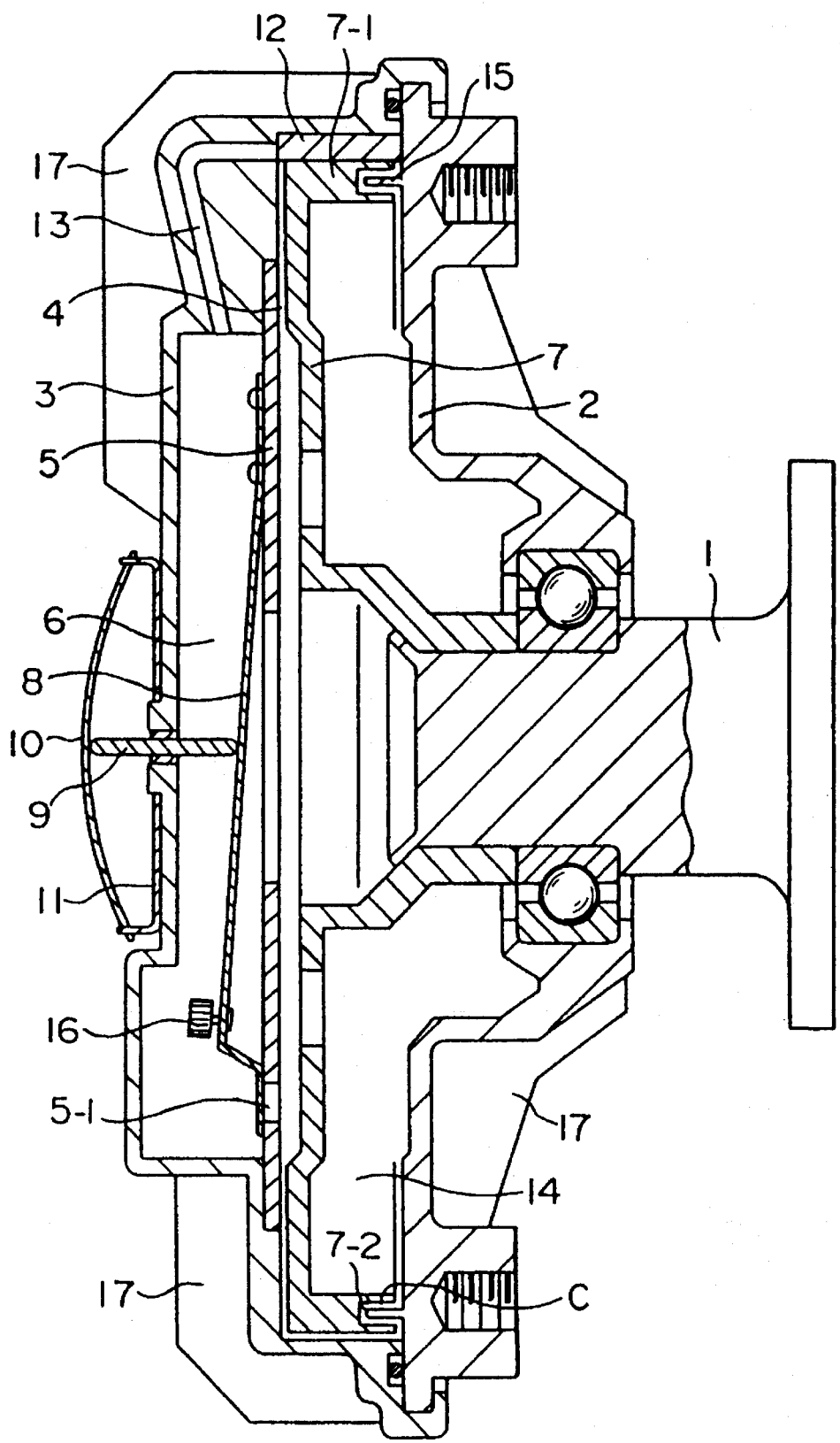
FIG. 1 is an elevational view, partly in section, of a fluid fan coupling embodying this invention, in which a driving disc has a cylindrical wall projecting in one axial direction from its outer periphery and giving the disc a substantially C-shaped cross section, and defines an oil storage chamber with its projecting wall and the wall of a closed housing in which the disc is mounted.

A device embodying this invention includes a driving disc 7 secured about one end of a rotary shaft 1 having a mounting flange at the other end thereof, as shown in FIG. 1. The disc 7 has a cylindrical wall 7-1 projecting in one axial direction from its outer periphery and giving the disc 7 a substantially C-shaped cross section along its radius. The projecting wall 7-1 has an axial width of 12.0 mm, and the disc 7 has a total width of 14.0 mm along its outer periphery and an outside diameter of 146.5 mm. A casing 2 is supported by a bearing on the shaft 1 and carries a cooling fin 17 on its outer surface. The casing 2 and a cover 3 closing it define a closed housing in which the disc 7 is disposed, and which is driven by the shaft 1.

Figure 7:
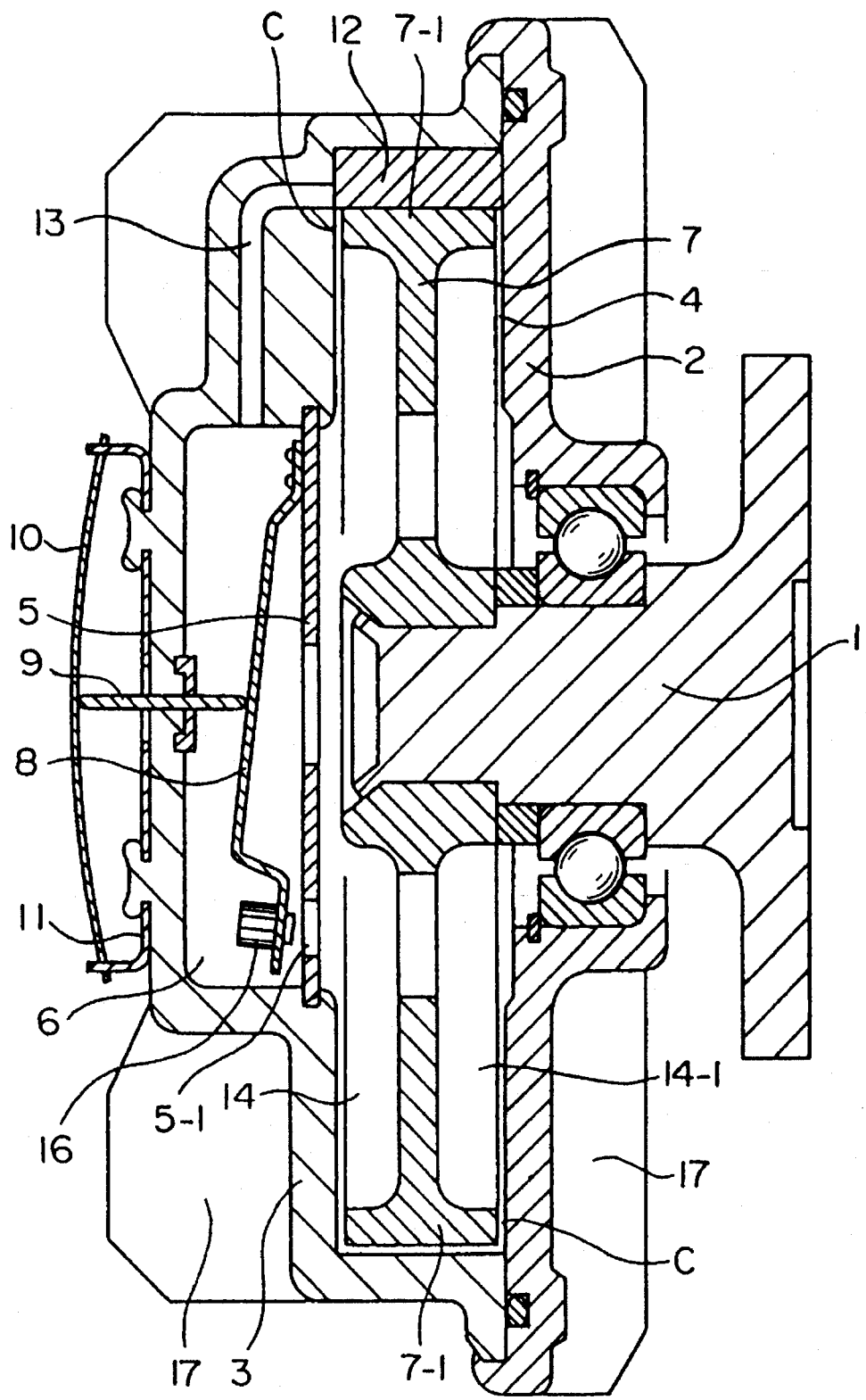
FIG. 7 is a view similar to FIG. 6, but showing a different device embodying this invention, in which a driving disc has a cylindrical wall projecting in two opposite axial directions from its outer periphery and giving the disc a substantially I-shaped cross section, and defines two oil storage chambers with its projecting wall and the wall of a closed housing.

Another device embodying this invention includes a driving disc 7 secured about one end of a rotary shaft 1, and having a cylindrical wall 7-1 projecting in two axially opposite directions from its outer periphery and giving the disc 7 a substantially I-shaped cross section, as shown in FIG. 7. The disc 7 has an overall width of 14.0 mm along its outer periphery including the wall 7-1 and an outside diameter of 146.5 mm. A casing 2 is supported by a bearing on the shaft 1, and the casing 2 and a cover 3 closing it define a closed housing. The disc 7, its projecting wall 7-1 and the closed housing define two oil storage chambers 14 and 14-1 for storing a part of oil from a torque transfer chamber 4 to lower the level of oil therein when the engine is out of operation, or is operating with a low input, while the device as shown in FIG. 1 has a single oil storage chamber 14.

Figure 2:
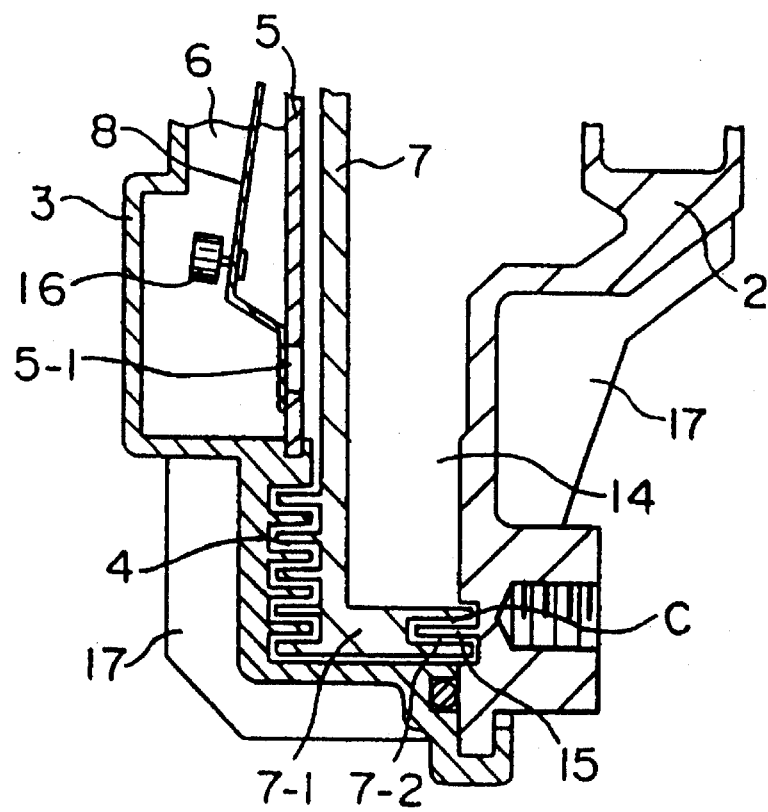
FIG. 2 is a view similar to a part of FIG. 1, but showing a modified form of device.
Figure 3:
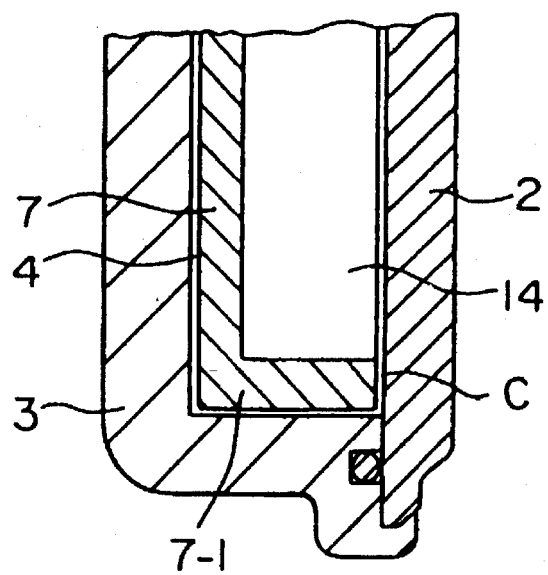
FIG. 3 is an enlarged view similar to a part of FIG. 1, but showing another modified form of device.
Figure 5:
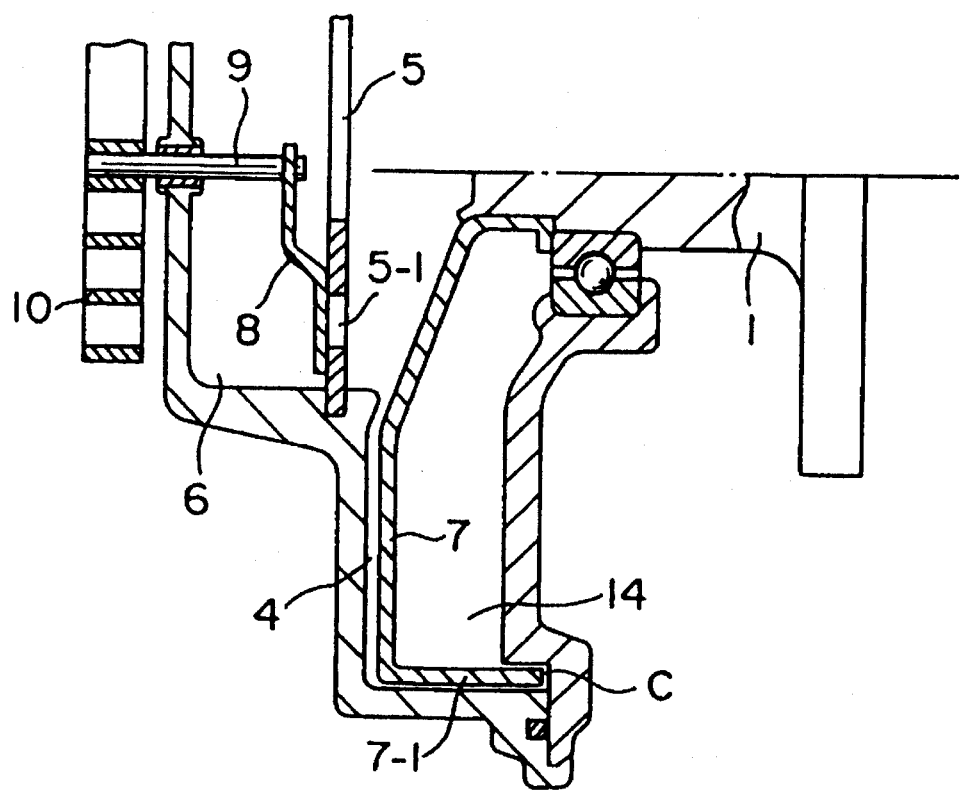
FIG. 5 is a view similar to a part of FIG. 1, but showing still another modified form of device.
Figure 18:
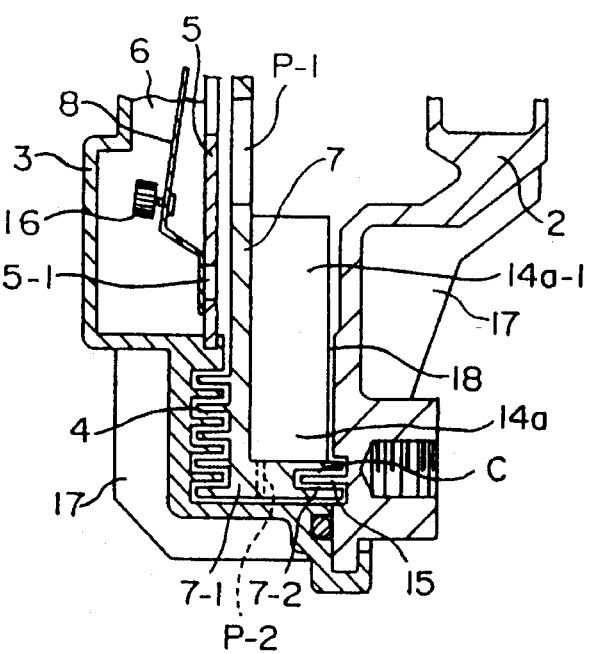
FIG. 18 is a view similar to a part of FIG. 15, but showing still another modified form of device.

The interior of the closed housing is divided by a partition 5 into the torque transfer chamber 4 in which the disc 7 is enclosed, and an oil reservoir 6. The partition 5 has an oil flow control hole 5-1 for controlling the flow of oil from the oil reservoir 6 to the torque transfer chamber 4. A torque transfer gap is maintained between the disc 7 and the wall surface of the closed housing facing it. The free end or ends of the projecting wall 7-1 are spaced apart from the adjacent wall surface or surfaces of the closed housing by a very small clearance or clearances c. The clearance (or clearances) c has been found to be very effective for preventing the "accompanying rotation" of the fan if the clearance c has a width of 0.3 to 0.8 mm when the disc 7 has an outside diameter of 80 to 230 mm, while the oil has a viscosity of 1,000 to 30,000 cSt. The disc 7 is easy to manufacture by pressing from a plate, as shown in FIG. 5. FIGS. 2 and 18 show a labyrinth mechanism formed in the torque transfer chamber 4 by the mutually facing surfaces of the cover 3 and the disc 7.

A valve member 8 is provided for opening and closing the oil flow control hole 5-1 of the partition 5. The valve member 8 has one end riveted to the partition 5, and another end positioned in front of the hole 5-1. The valve member 8 is situated in the oil reservoir 6 and connected by a rod 9 to an external temperature sensor 10 deformably in response to a variation of ambient temperature as detected by the sensor 10. The temperature sensor 10 may be a strip of bimetal having two opposite ends fastened to a bracket 11 secured to the outer surface of the cover 3 (see FIGS. 1, 6, 15, 19 or 20), or a coil of bimetal (FIG. 21).

A dam 12 is provided in the inner periphery of the closed housing facing the outer periphery of the disc 7 where oil is centrifugally collected. The dam 12 extends along the whole width of the outer periphery of the disc 7. The housing, or the cover 3 has an oil circulating passage 13 connected to the dam 12 and extending from the torque transfer chamber 4 to the oil reservoir 6. The dam 12 and the oil circulating passage 13 perform an oil pumping action.

The disc 7 having a substantially C-shaped cross section defines only a single oil storage chamber 14 with its projecting wall 7-1 and the case 2, while the disc 7 having a substantially I-shaped cross section defines two oil storage chambers 14 and 14-1 with its projecting wall 7-1 and the cover 3 and casing 2, respectively. In either event, the oil storage chamber or chambers store a part of oil from the torque transfer chamber 4 to lower the level of oil therein when the engine is out of operation, or is operating with a low input.

Figure 31:
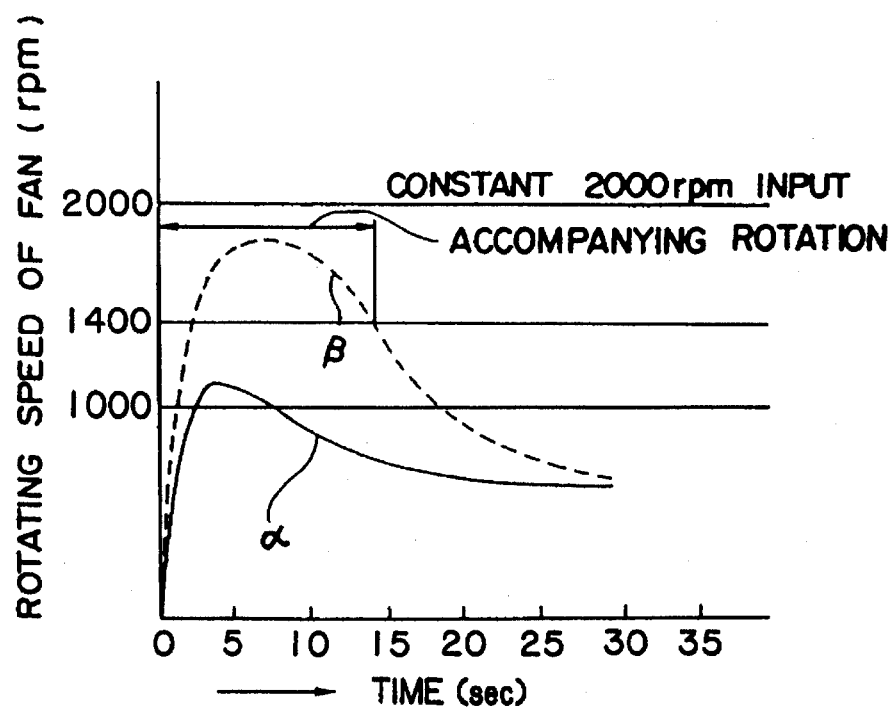
FIG. 31 is a graph comparing the device of this invention and the known device with respect to the "accompanying rotation" of the fan which occurs when the engine is placed in operation.
Figure 32:
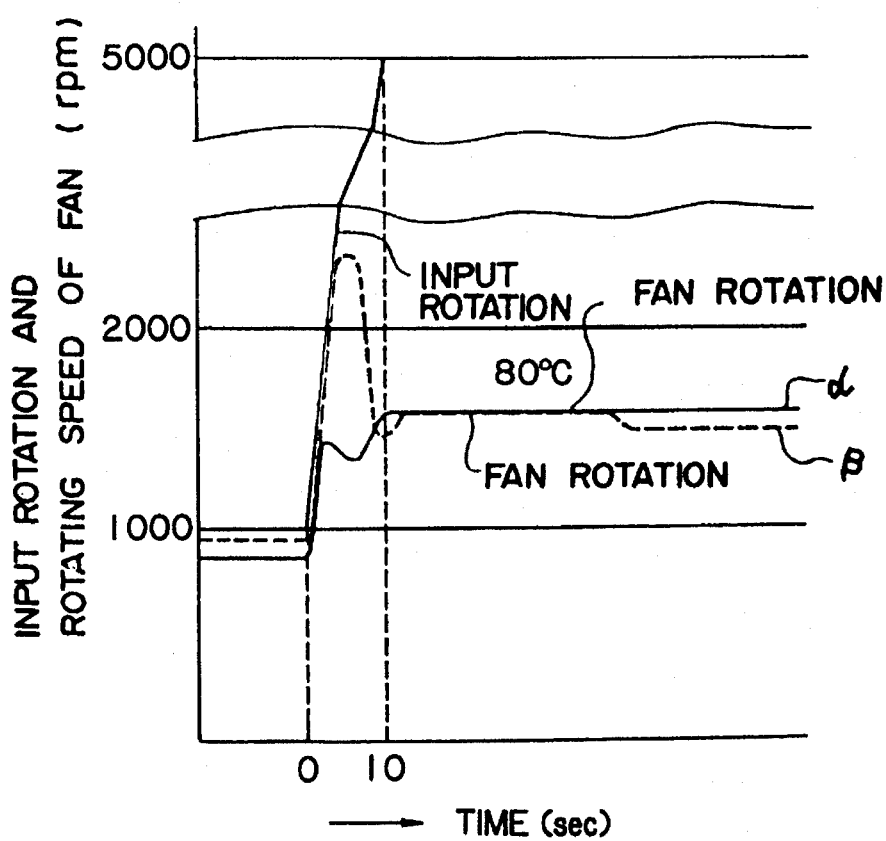
FIG. 32 is a graph comparing the device of this invention and the known device with respect to the "accompanying rotation" of the fan which occurs upon acceleration.
Figure 33A:
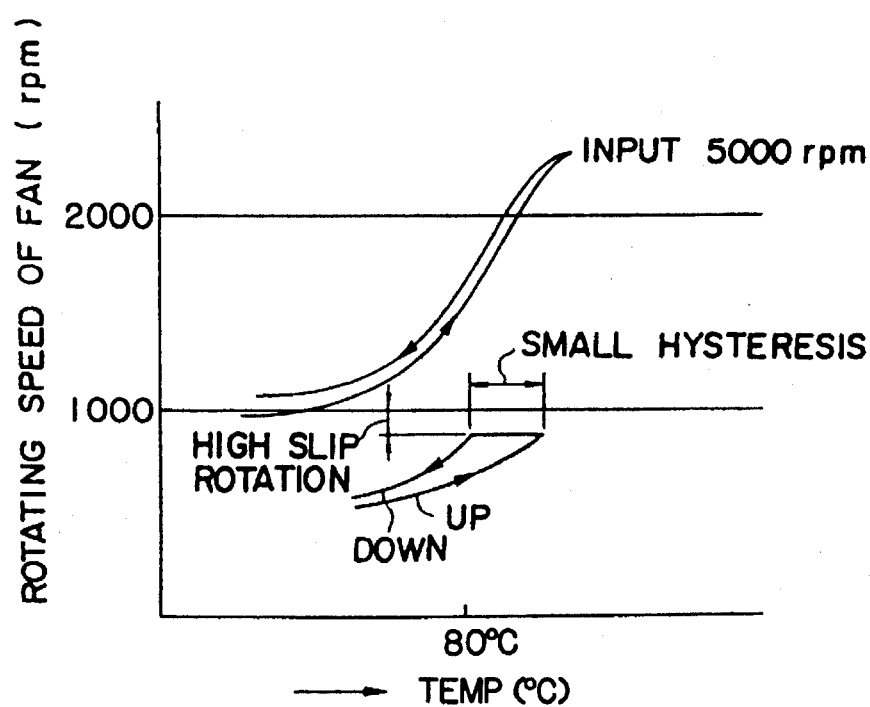
FIG. 33(A) is a graph showing the temperature dependence of fan rotation as observed with the device of this invention.
Figure 33B:
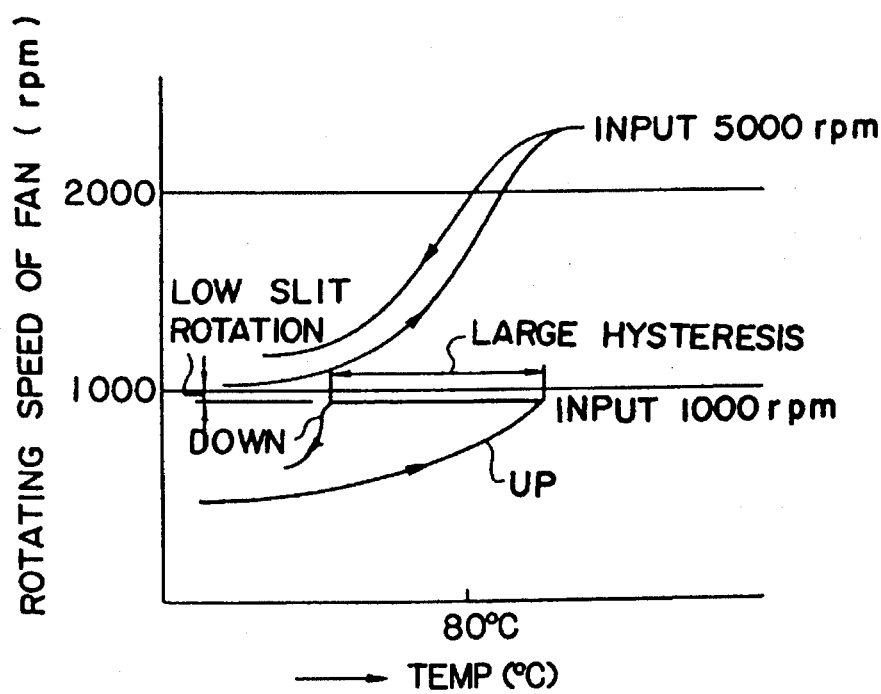
FIG. 33(B) is a graph similar to FIG. 33(A), but showing the results obtained from the known device.
Figure 34:
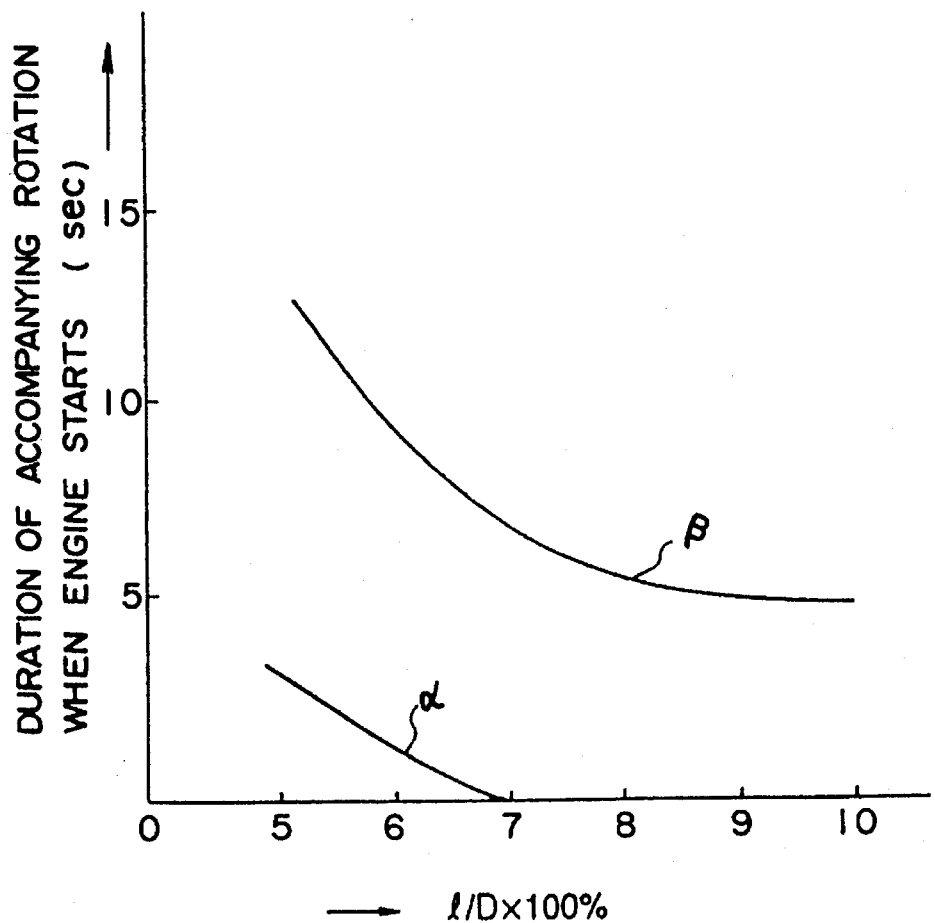
FIG. 34 is a graph showing the duration of the "accompanying rotation" of the fan in relation to the width of the outer periphery of the driving disc.
Figure 35:
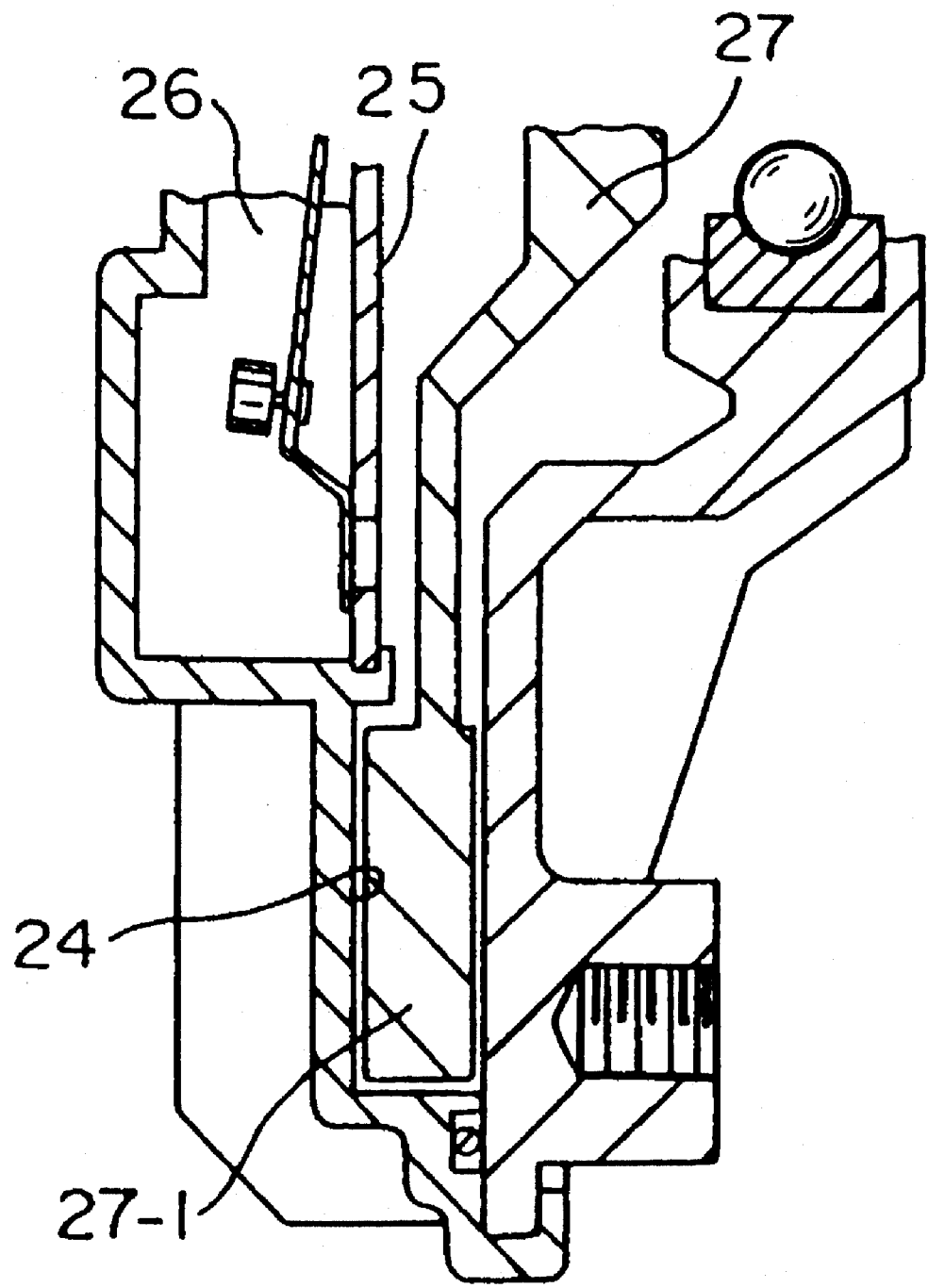
FIG. 35 is a fragmentary elevational view, partly in section, of the known device.

The disc 7 preferably has an overall outer peripheral width which is at least equal to 7% of its outside diameter, including the width of its projecting wall 7-1. It has been found to be the minimum width that is required for restraining the "accompanying rotation" of the fan when the engine is placed in operation, as shown in FIG. 34. When the engine is rapidly accelerated for operation with a high input during the travel of the vehicle, the "accompanying rotation" of the fan is effectively restrained by the storage of the oil in the oil storage chamber or chambers 14 and 14-1, and by the pumping action of the dam 12 which is sufficiently wide to extend along the whole outer peripheral width of the disc 7. The "accompanying rotation" of the fan which occurs when the engine is placed in operation refers to the interval of time from the time of its placement in operation to the point of time at which the rotating speed of the fan drops to 1400 rpm when there is a constant input of 2000 rpm, as shown in FIG. 31. The device of this invention can keep the maximum rotating speed of the fan at a level as low as about 1200 rpm, while the known device allows it to rise to about 1900 rpm, as is obvious from FIG. 31.

Figure 4:
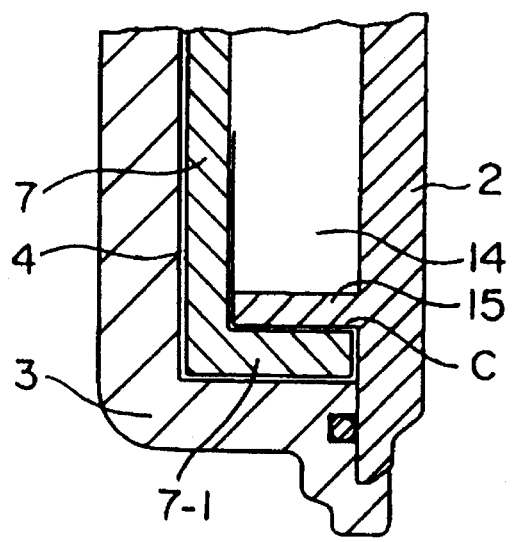
FIG. 4 is an enlarged view similar to a part of FIG. 1, but showing still another modified form of device.

The disc 7 having a substantially C-shaped cross section may have an annular groove 7-2 formed at the free, or rear end of its projecting wall 7-1, while the casing 2 has an annular projection 15 formed on its inner surface and fitted loosely in the annular groove 7-2, as shown in FIGS. 1, 2, 15 or 18. The casing 2 may have on its inner surface an axially extending annular projection 15 surrounded by the projecting wall 7-1 of the disc 7 and spaced apart from it by a very small clearance c, as shown in FIG. 4. The casing 2 may alternatively be bent to form a recess in which the free end of the projecting wall 7-1 of the disc 7 is fitted, while maintaining a small clearance c therebetween, as shown in FIG. 5. In either event, it is effectively possible to restrict the flow of oil out of the oil storage chamber 14 and thereby restrain the "accompanying rotation" of the fan. The same results can be attained, even if the projecting wall 7-1 may have an annular projection, while the casing 2 has an annular groove.

Figure 8:
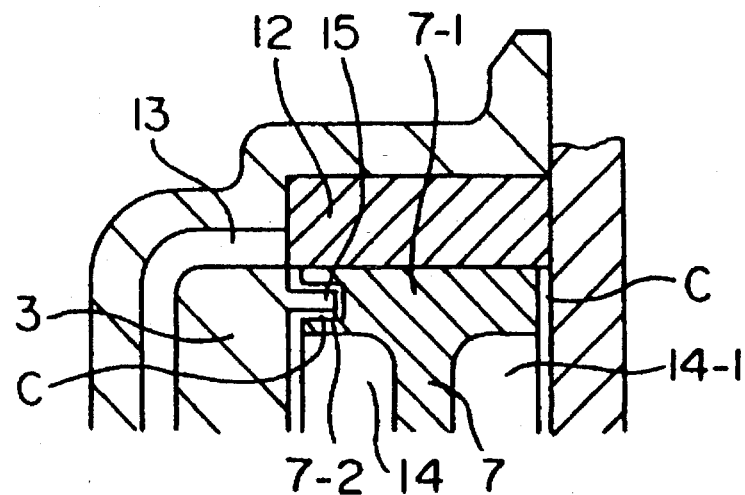
FIG. 8 is an enlarged view similar to a part of FIG. 7, but showing a modified form of device.
Figure 9:
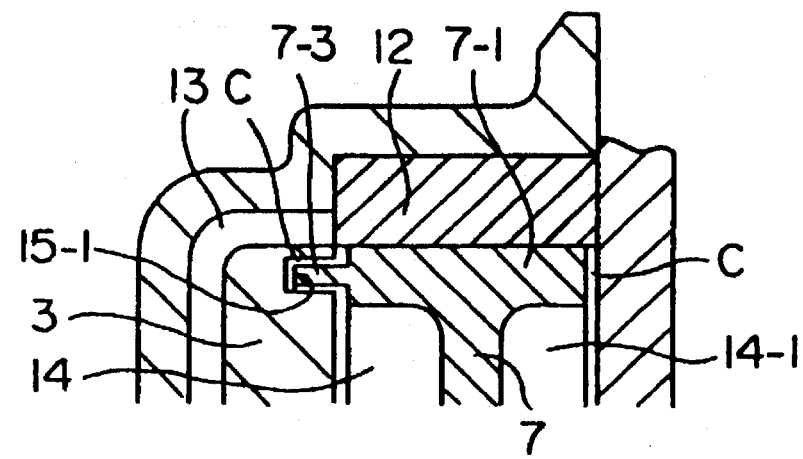
FIG. 9 is an enlarged view similar to a part of FIG. 7, but showing another modified form of device.
Figure 10:
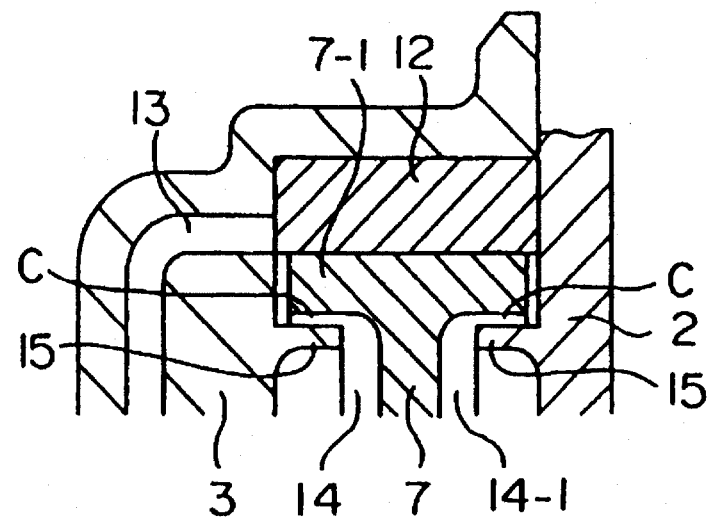
FIG. 10 is an enlarged view similar to a part of FIG. 7, but showing still another modified form of device.

The disc 7 having a substantially I-shaped cross section may have an annular groove 7-2 formed at one of the free ends of its projecting wall 7-1, while the cover 3 has an annular projection 15 formed on its inner surface and fitted loosely in the annular groove 7-2, as shown in FIG. 8. Alternatively, the disc 7 may have an annular projection 7-3 at one end of its projecting wall 7-1, while the cover 3 has an annular groove 15-1 in which the annular projection 7-3 is loosely fitted, as shown in FIG. 9. In either event, it is possible to provide another combination of an annular projection and an annular groove at the other free end of the projecting wall 7-1, too. It is also possible to provide a pair of axially extending annular projections 15 on the inner surfaces of the casing 2 and the cover 3, respectively, slightly radially inwardly of the projecting wall 7-1 of the disc 7, so that a small clearance c may exist between the wall 7-1 and the projections 15, as shown in FIGS. 10, 12, 13 or 14. Whichever of these arrangements may be employed, it is possible to restrict the flow of oil from the oil storage chambers 14 and 14-1 and thereby restrain the "accompanying rotation" of the fan still more effectively.

Figure 6:
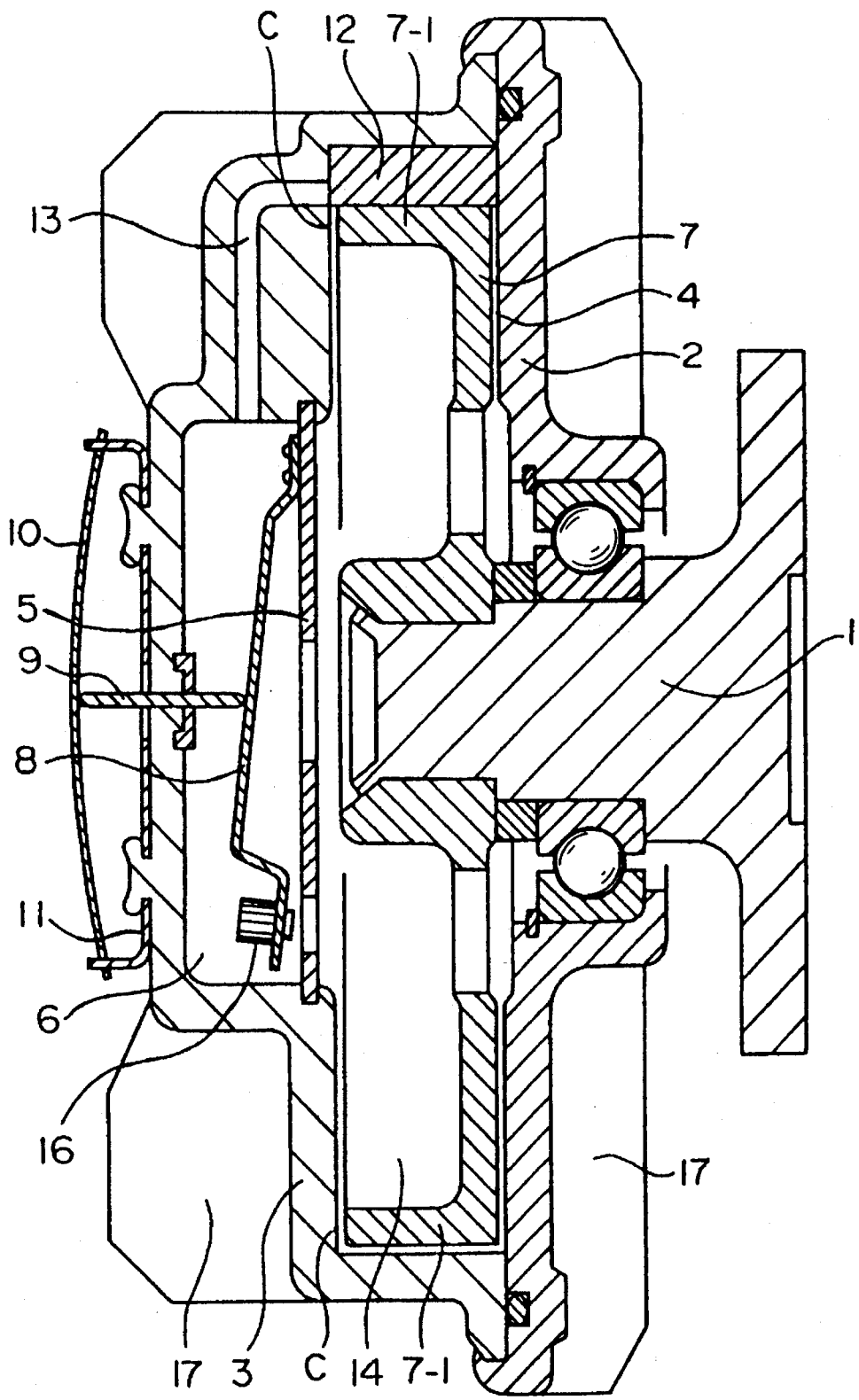
FIG. 6 is a view similar to FIG. 1, but showing still another modified form of device.
Figure 19:
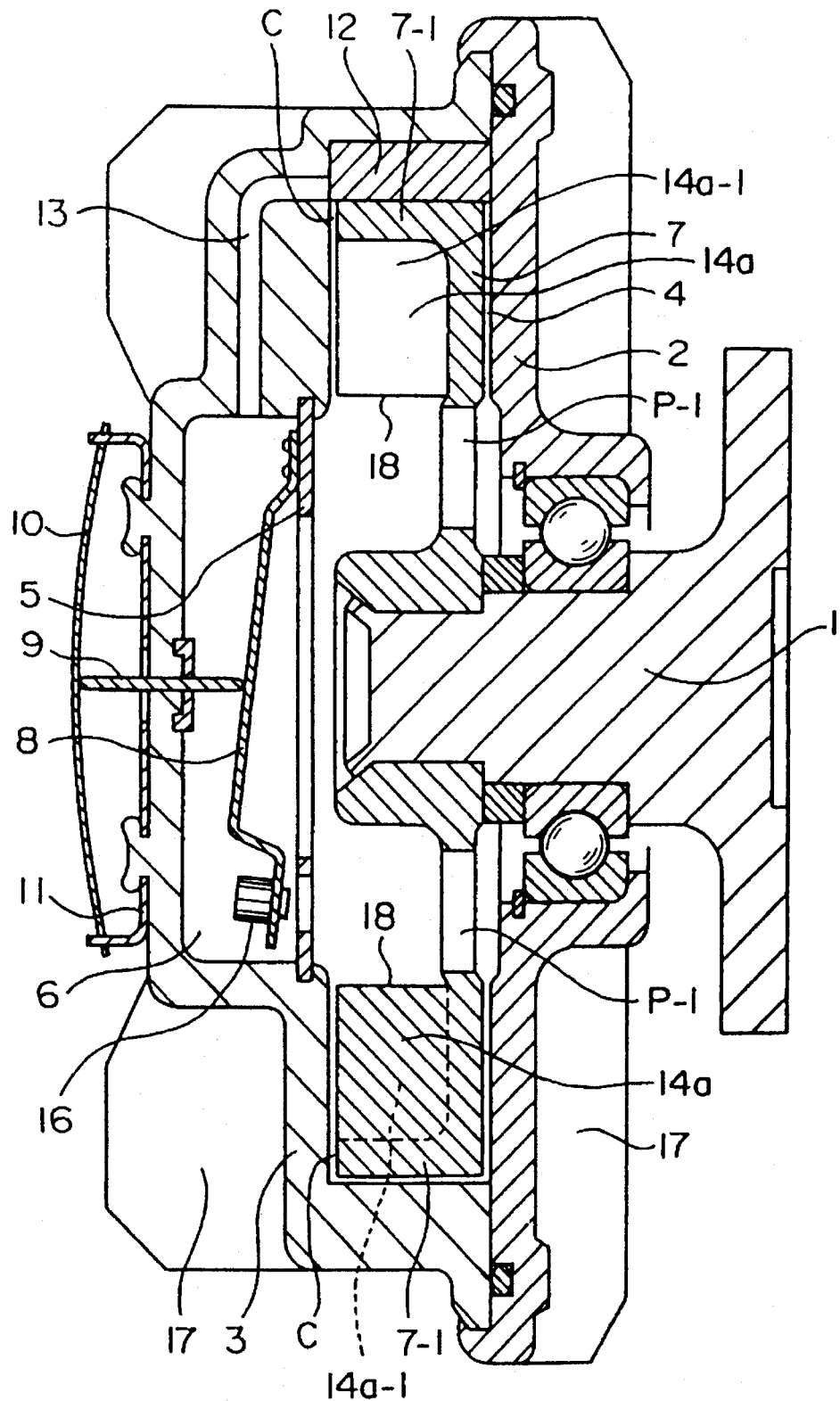
FIG. 19 is a view similar to FIG. 15, but showing still another modified form of device.

The projecting wall 7-1 of the disc 7 having a substantially C-shaped cross section may be directed either toward the casing 2, as shown in any of FIGS. 1 to 5 and 15 to 18, or toward the cover 3, as shown in FIG. 6 or 19, so that the disc 7, its projecting wall 7-1 and either the casing 2 or the cover 3 may define the oil storage chamber 14. Both arrangements are similarly effective for preventing the "accompanying rotation" of the fan.

Figure 11:
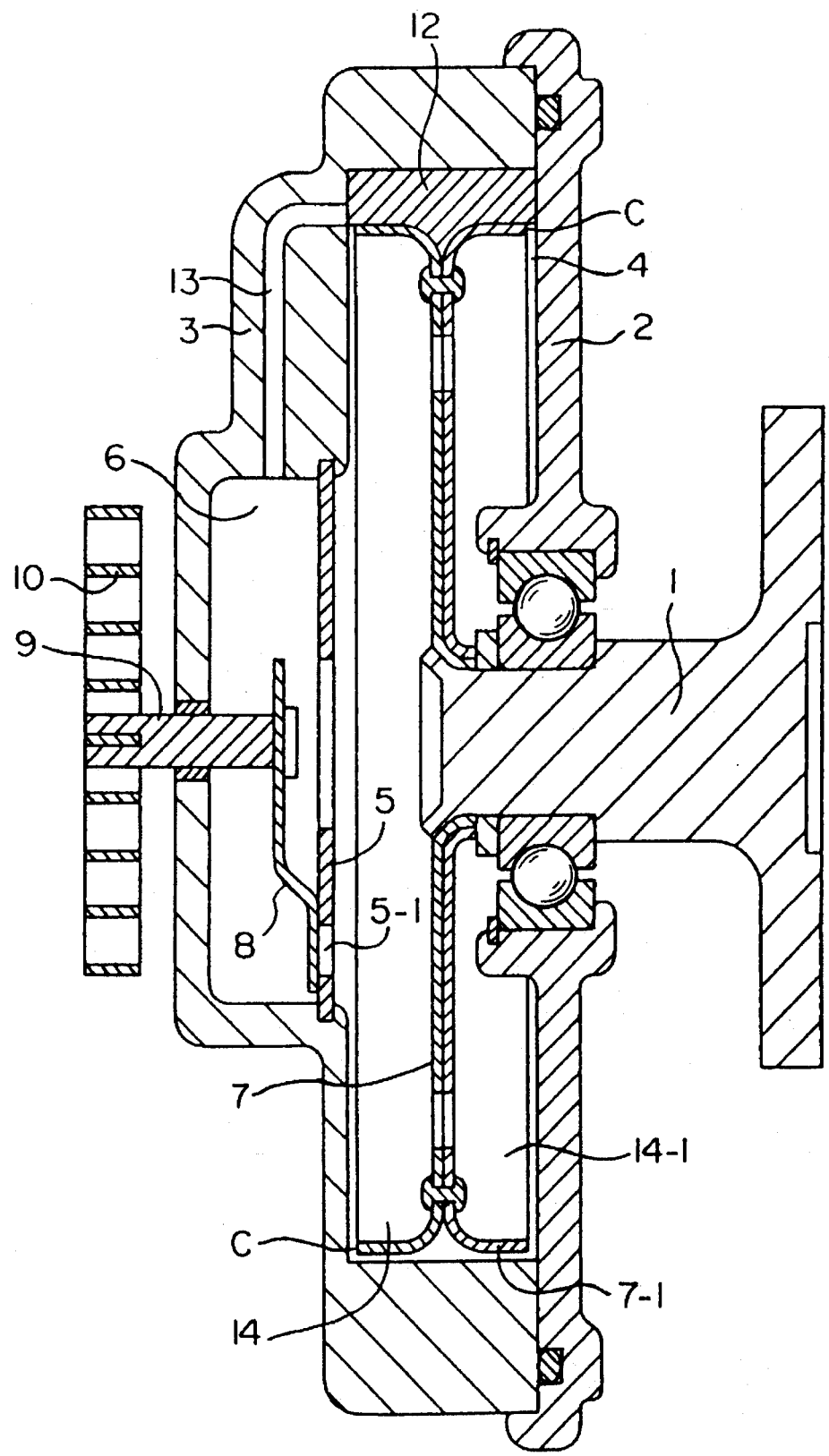
FIG. 11 is a view similar to FIG. 7, but showing still another modified form of device.
Figure 12:
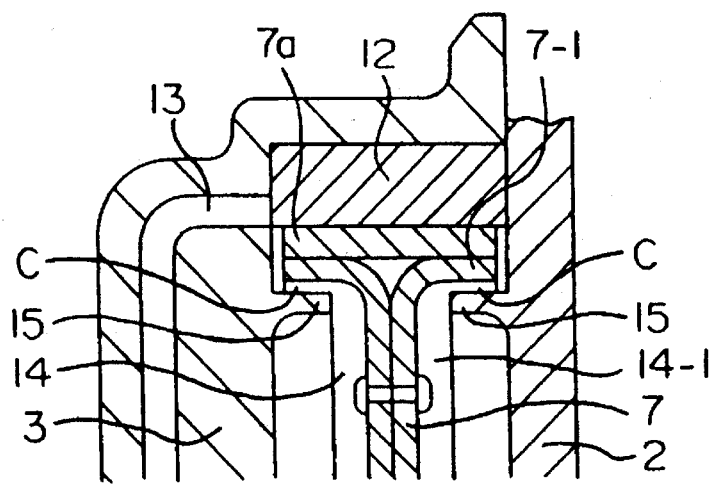
FIG. 12 is a view similar to a part of FIG. 11, but showing a modified form of device.
Figure 13:
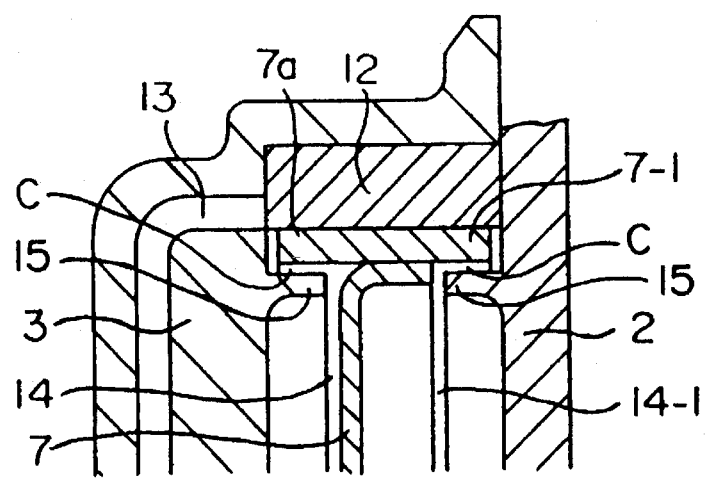
FIG. 13 is a view similar to a part of FIG. 11, but showing another modified form of device.
Figure 14:
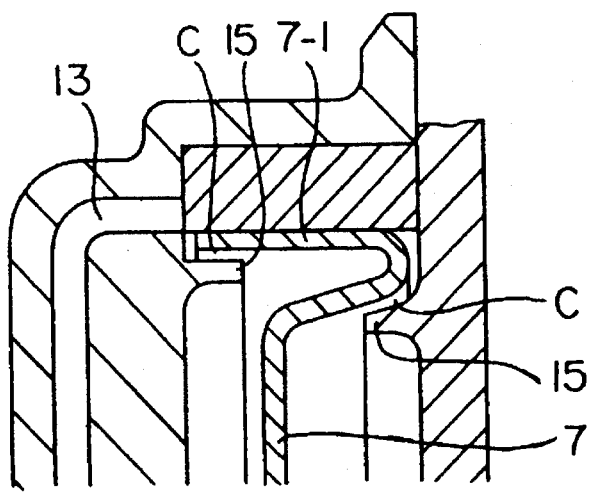
FIG. 14 is a view similar to a part of FIG. 11, but showing still another modified form of device.
Figure 15:
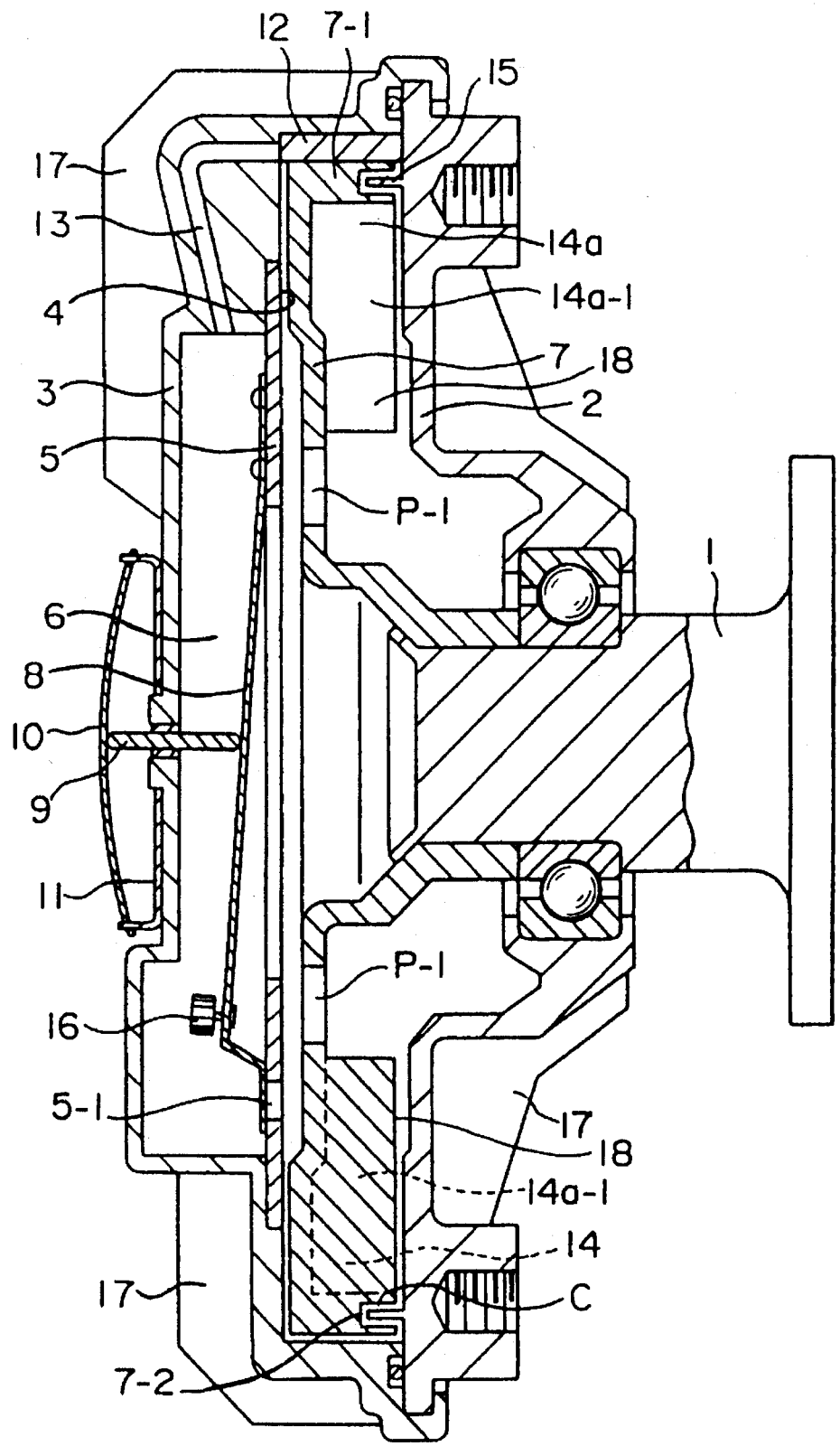
FIG. 15 is a view similar to FIG. 1, but showing a modified form of device.
Figure 16:
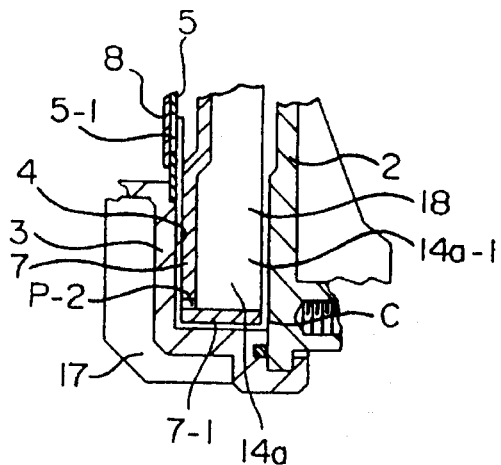
FIG. 16 is a view similar to a part of FIG. 15, but showing a modified form of device.
Figure 17:
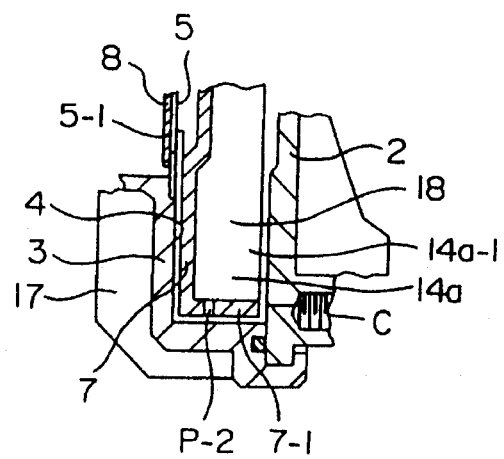
FIG. 17 is a view similar to a part of FIG. 15, but showing another modified form of device.

The disc 7 having a substantially I-shaped cross section is easy to manufacture if plates are punched, bent, and joined to parts forming the projecting wall 7-1 by e.g. riveting, spot welding or brazing, as shown in FIG. 11. A cylindrical sleeve 7a may be fitted about the projecting wall 7-1, as shown in FIG. 12 or 13. The disc 7 may alternatively be formed from a single plate by pressing, as shown in FIG. 14.

Figure 20:
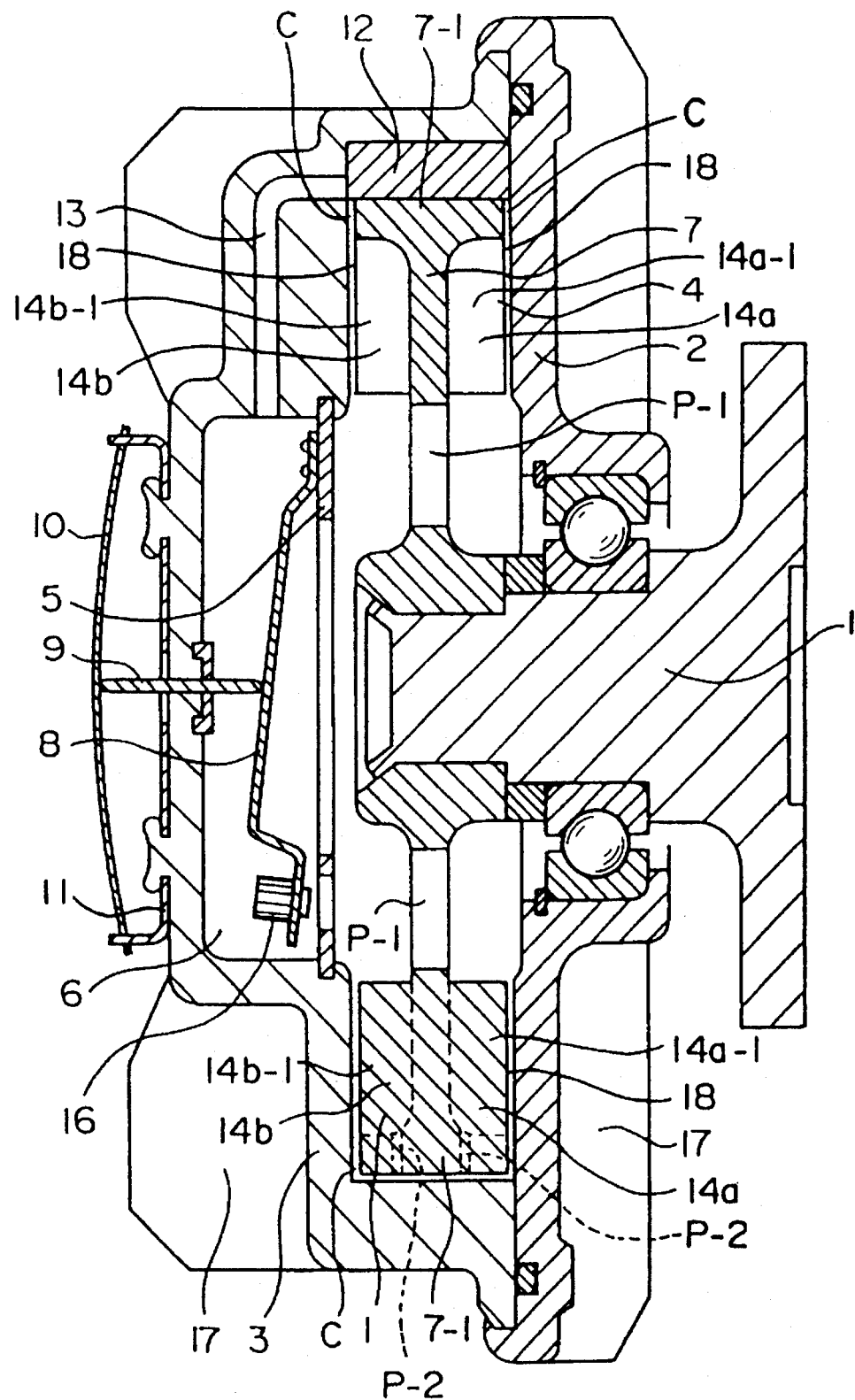
FIG. 20 is a view similar to FIG. 7, but showing still another modified form of device.
Figure 21:
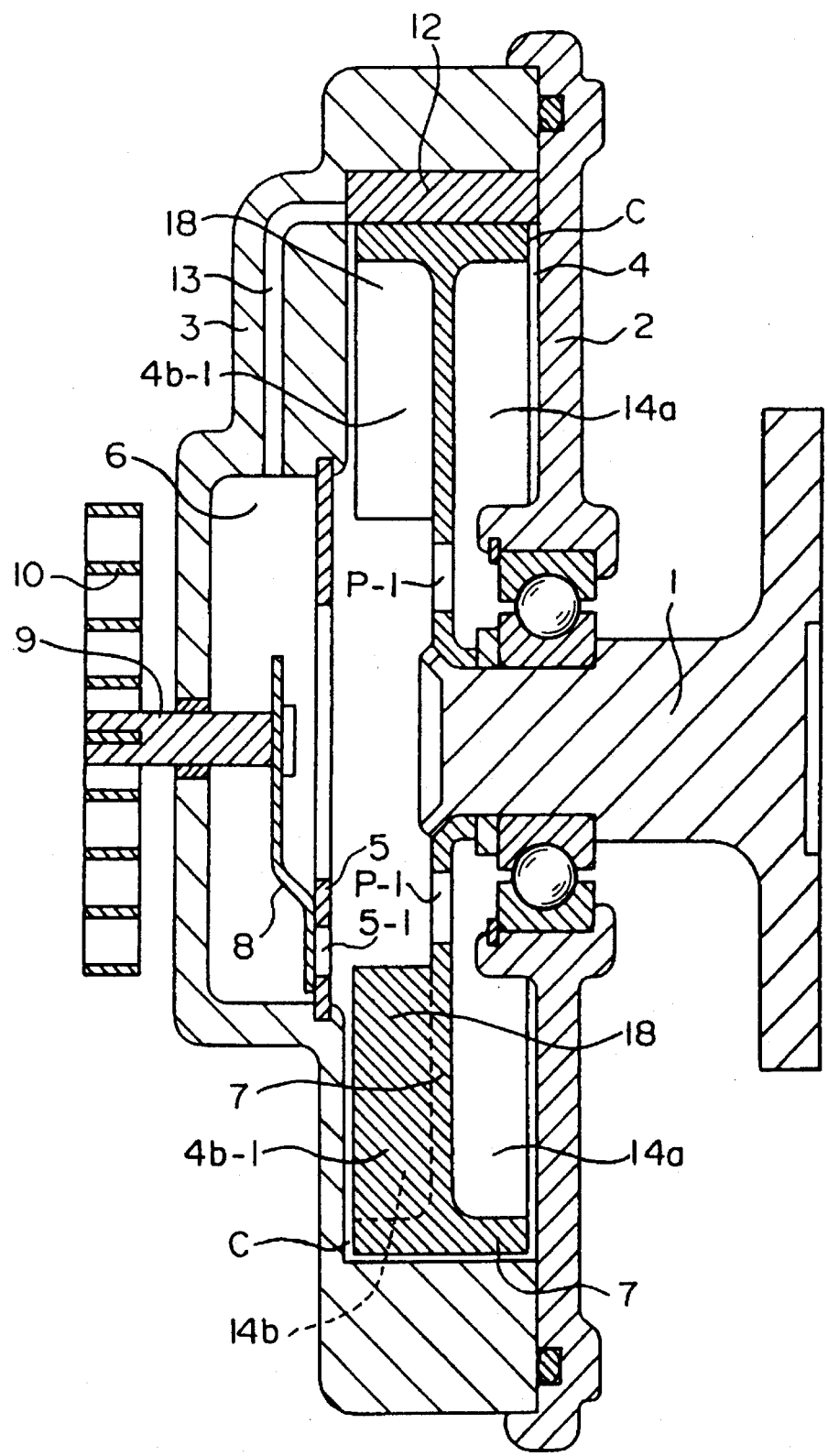
FIG. 21 is a view similar to FIG. 7, but showing still another modified form of device.

The device shown in any of FIGS. 15 to 19 has a single oil storage chamber 14a defined on one side of the disc 7, while the device shown in FIG. 20 or 21 has two oil storage chambers 14a and 14b defined on both sides, respectively, of the disc 7. Each oil storage chamber 14a or 14b is divided by a plurality of radially extending partitions 18 into a plurality of portions 14a-1 or 14b-1, except the device of FIG. 21 in which only one of the two chambers is divided into a plurality of portions 14b-1. Each chamber 14a or 14b stores a part of oil from the torque transfer chamber 4 to lower the level of oil therein when the engine is out of operation, or is operating with a low input. The disc 7 may have a plurality of holes P-1 around its inner periphery and may also have a hole or holes P-2 near the root of each partition 18.

Figure 22:
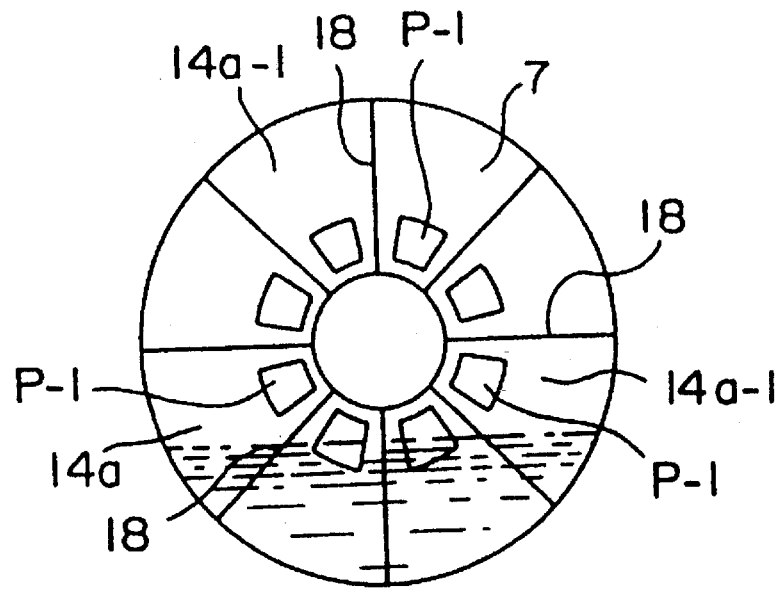
FIG. 22 is a schematic top plan view, on a reduced scale, of the disc in the device as shown in FIG. 21, while the device is out of operation.

If the engine is stopped when the torque transfer chamber 4 contains a large amount of oil, or when the oil flow control hole 5-1 is open, oil flows out of the torque transfer chamber 4 through the holes P-1 and the clearances c and enters some lower divided portions of the oil storage chamber 14a, or the lower four divided portions 14a-1 as shown in FIG. 22, though not entering any of the upper four divided portions 14a-1. As a result, there occurs a reduction in the amount of oil remaining in the torque transfer chamber 4.

Figure 23:
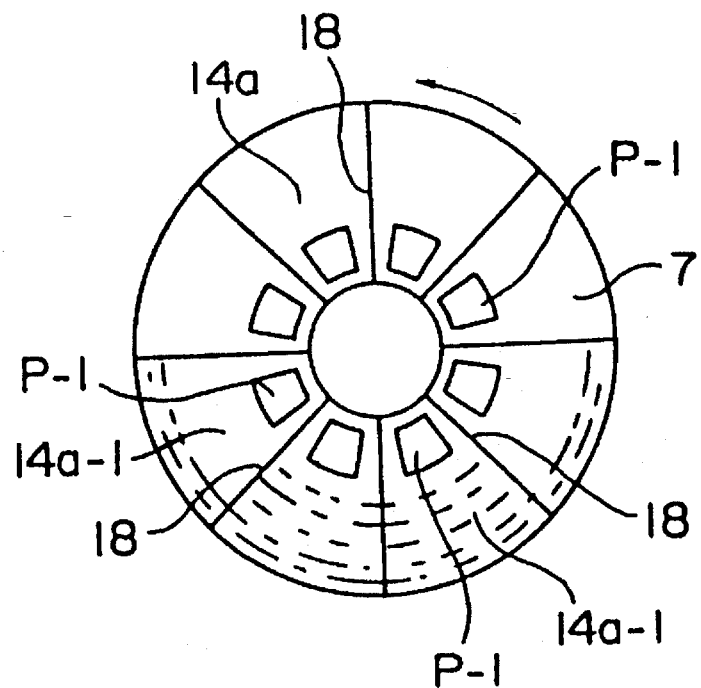
FIG. 23 is a view similar to FIG. 22, but showing the disc when the device is placed in operation.

If the engine is started, the disc 7 rotates with oil present only in the lower four divided portions 14a-1 of the oil storage chamber, while no oil is present in any other divided portion thereof, as shown in FIG. 23. Although the centrifugal force produced by the rotation of the disc 7 causes oil to flow out into the torque transfer chamber 4 through the clearances c, the amount of the oil which flows out is very small, insofar as it flows out only from the four divided portions 14a-1.

While the oil collected by the dam 12 is forced under pressure into the oil circulating passage 13, a part of such oil flows through the holes P-2 and the clearances c into the divided portions 14a-1 not containing oil. As a result, there occurs a reduction in the amount of oil which the torque transfer chamber 4 contains, while the oil pumped from the torque transfer chamber 4 by the dam 12 is forced into the oil reservoir 6 through the passage 13. Thus, the "accompanying rotation" of the fan which immediately follows the start of the engine is restrained very quickly.

When the disc 7 is rotating constantly with the oil flow control hole 5-1 left open, the centrifugal force causes oil to flow from the oil storage chamber 14a to the torque transfer chamber 4 through the clearances c, while oil is also supplied from the oil reservoir 6 to the torque transfer chamber 4 through the hole 5-1, whereby torque is transmitted by oil from the disc 7 to the closed housing for driving it. The oil in the torque transfer chamber 4 is pumped again by the dam 12 for recirculation into the oil reservoir 6 through the passage 13.

If the engine is rapidly accelerated during the normal travel of the vehicle, a sharp increase in the rotation of the disc 7 causes oil to be collected under pressure from the torque transfer chamber 4 by the dam 12 and the dam 12 forces a part of oil into the oil reservoir 6 through the oil recirculating passage 13. Another part of oil, however, flows into the oil storage chamber 14a through the clearances c and the holes P-2, so that it is possible to reduce the amount of oil in the torque transfer chamber 4 and prevent the "accompanying rotation" of the fan when the engine is accelerated.

Figure 24:
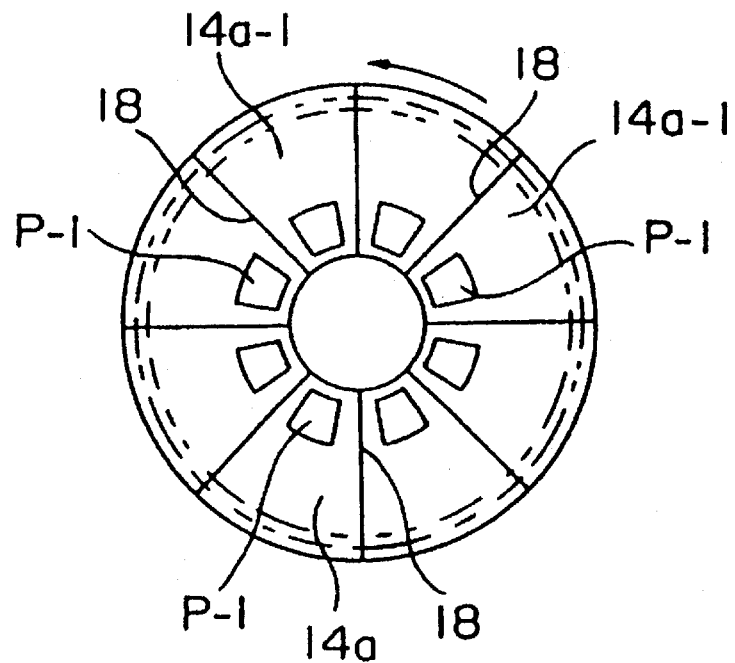
FIG. 24 is a view similar to FIG. 22, but showing the state of oil in the divided portions of an oil storage chamber defined by the disc while the device is continuously operated at a constant speed.
Figure 25:
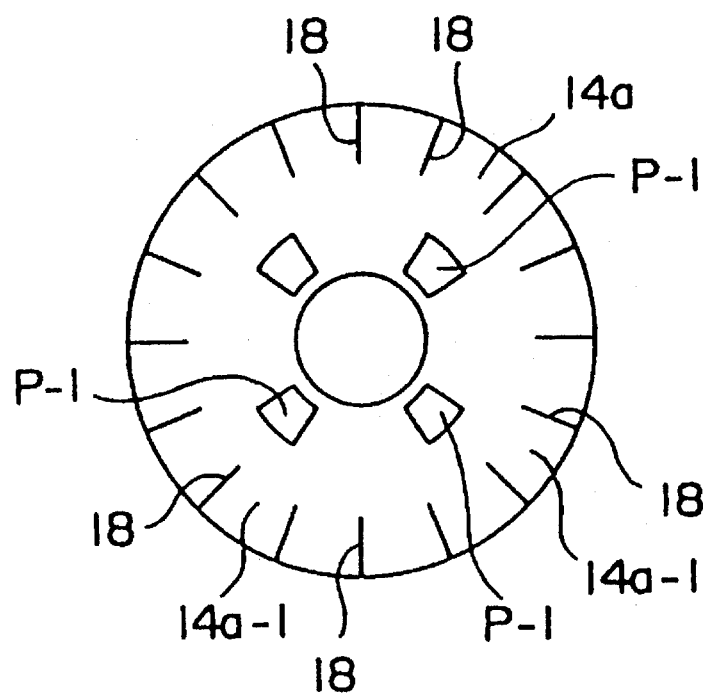
FIG. 25 is a view similar to FIG. 22, but showing a modified form of disc.

FIG. 25 shows partitions 18 which are smaller in length than those shown in FIGS. 22 to 24. The partitions 18 can be made smaller in length without exerting any appreciable effect on the effectiveness of the device for restraining the "accompanying rotation" of the fan following the acceleration of the engine during the normal travel of the vehicle as intended by the invention, though the device may be somewhat less effective for preventing the "accompanying rotation" of the fan following the start of the engine.

The projecting wall 7-1 of the disc 7 may be provided with an annular rib or ribs 19 projecting radially inwardly from its inner surface, as shown in FIGS. 26 to 30. The rib or ribs 19 add to the effectiveness of the device in restraining the "accompanying rotation" of the fan.

Figure 26:
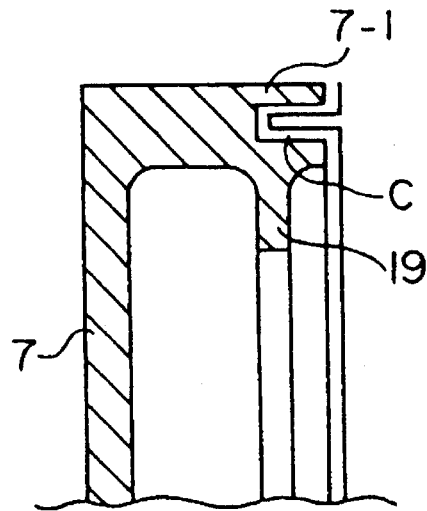
FIG. 26 is a fragmentary sectional view of a driving disc having a substantially C-shaped cross section and including an axially projecting wall provided with an annular rib.
Figure 27:
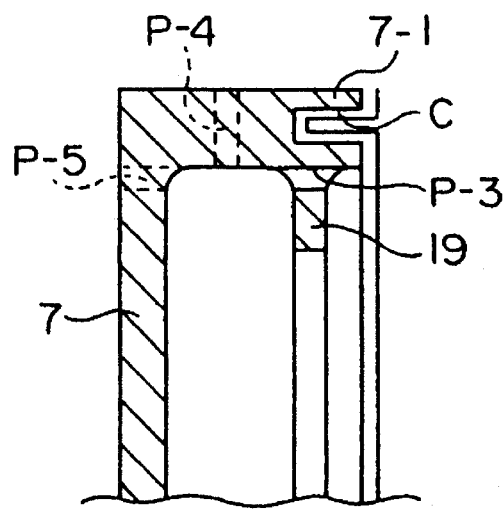
FIG. 27 is a view similar to FIG. 26, but showing a modified form of disc.
Figure 28:
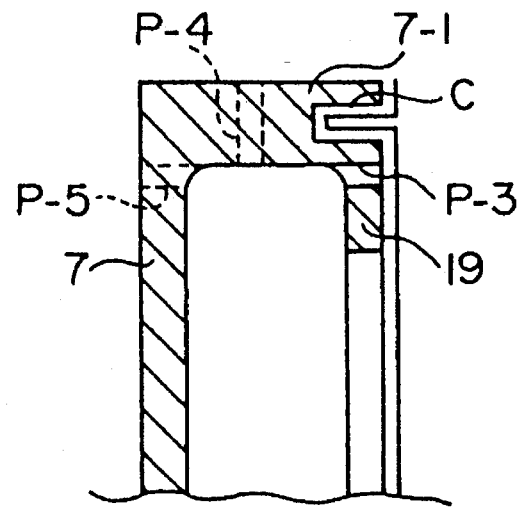
FIG. 28 is a view similar to FIG. 26, but showing another modified form of disc.
Figure 29:
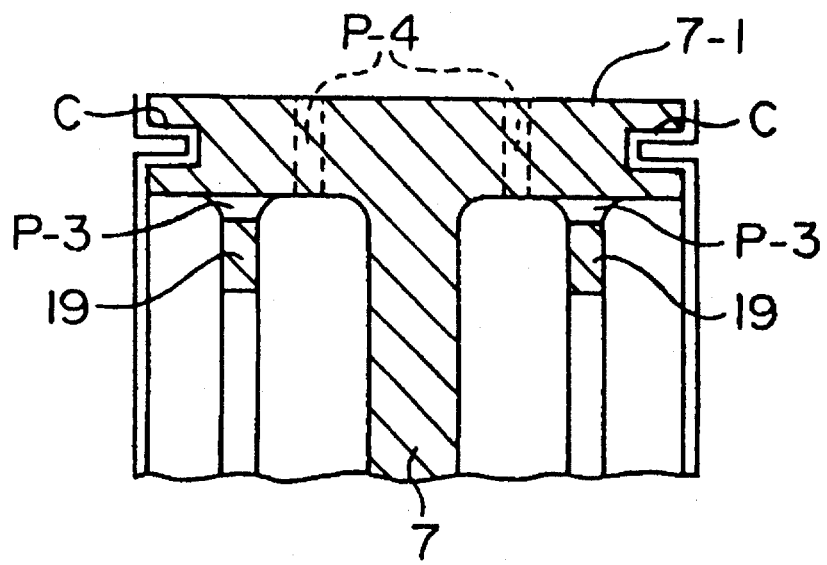
FIG. 29 is a fragmentary sectional view of a driving disc having a substantially I-shaped cross section and including a wall projecting in two axially opposite directions and provided with two annular ribs.
Figure 30:
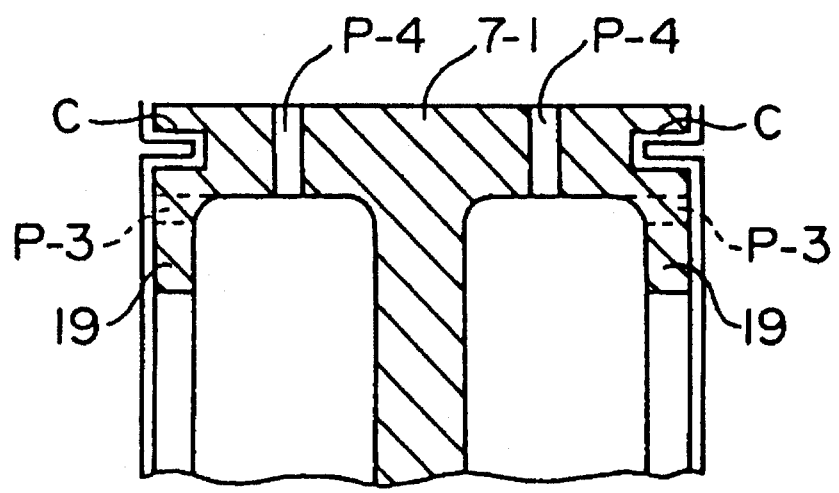
FIG. 30 is a view similar to FIG. 29, but showing a modified form of disc.

The disc 7 having a substantially C-shaped cross section may have a single annular rib 19, as shown in any of FIGS. 26 to 28, while the disc 7 having a substantially I-shaped cross section may have a pair of annular ribs 19, as shown in FIG. 29 or 30. The or each rib 19 causes oil to stay in the oil storage chamber 14, or some divided portions 14a-1 or 14b-1 thereof until it overflows the rib 19 to reach the clearances c. Thus, it is possible to reduce the amount of oil flowing into the torque transfer gap and thereby restrain the "accompanying rotation" of the fan.

The disc 7 shown in FIG. 27 or 28 has a plurality of small holes P-3, P-4 and P-5 formed in its rib 19, projecting wall 7-1, and principal wall 7. The disc 7 shown in FIG. 29 or 30 has a plurality of small holes P-3 and P-4 formed in its ribs 19 and projecting wall 7-1. The holes P-3 to P-5 promote the discharge of oil from the oil storage chamber 14, or some divided portions 14a-1 or 14b-1 thereof, whereafter it is quickly discharged by the dam 12. Similar results can be obtained, even if the holes P-3 of the rib or ribs 19 may be replaced by slits.

What is claimed is:

1. In a temperature-sensitive fluid fan coupling which comprises a rotary shaft, a casing supported by a bearing on said shaft and adapted for mounting a cooling fan on its outer periphery, a cover closing said casing so that said casing and cover may define a closed housing, a driving disc secured about said shaft at one end thereof within said casing, a partition having an oil flow control hole and dividing the interior of said housing into an oil reservoir and a torque transfer chamber in which said disc is disposed, said housing defining at least one dam facing the outer periphery of said disc where oil is centrifugally collected, and an oil circulating passage connected to said dam and extending from said torque transfer chamber to said oil reservoir, a temperature sensor provided on the outside of said cover for detecting the ambient temperature prevailing around the coupling, and a valve member situated in said oil reservoir, operationally connected to said sensor, and having one end positioned to close said oil flow control hole, said valve member being deformable to open said hole if said temperature detected by said sensor exceeds a predetermined level, so that a torque transfer gap defined between the mutually facing surfaces of said disc and said housing may have a differently sized area of effective contact with oil to control the transfer of torque from said shaft to said housing to be thereby driven, the improvement wherein said disc has a cylindrical wall projecting in at least one axial direction at its outer periphery, and said disc, said projecting wall and said housing define at least one oil storage chamber said disc having a plurality of radially extending partitions which divide said oil storage chamber into a plurality of portions.

2. A coupling as set forth in claim 1, wherein said wall projects in one axial direction from said disc to give it a substantially C-shaped cross section across its radius.

3. A coupling as set forth in claim 2, wherein said projecting wall has an axial width which is equal to at least 7% of the outside diameter of said disc.

4. A coupling as set forth in claim 2, wherein said housing has on its inner surface an axially extending annular projection spaced apart from said projecting wall by a very small clearance.

5. A coupling as set forth in claim 1, wherein said disc has a plurality of holes formed in radially outer portions of said partitions dividing said oil storage chamber.

6. A coupling as set forth in claim 1, wherein said wall projects in two axially opposite directions from said disc to give it a substantially I-shaped cross section across its radius, and said disc, said projecting wall and said housing define two oil storage chambers, one on each side of said disc.

7. A coupling as set forth in claim 6, wherein said projecting wall has an axial width which is equal to at least 7% of the outside diameter of said disc.

8. A coupling as set forth in claim 6, wherein one of a free end of said projecting wall and the inner surface of said housing which faces it has an annular projection, while the other has an annular groove in which said projection is loosely fitted.

9. A coupling as set forth in claim 6, wherein said housing has on its inner surface a pair of axially extending annular projections spaced apart from said projecting wall by a very small clearance.

10. A coupling as set forth in claim 6, wherein said disc has a pair of annular ribs projecting radially inwardly from the inner surface of said projecting wall.

11. A coupling as set forth in claim 10, wherein at least one of said disc, said projecting wall thereof and said ribs has a plurality of holes.

12. A coupling as set forth in claim 10, wherein said ribs have a plurality of slits.

13. In a temperature sensitive fluid fan coupling which comprises a rotary shaft, a casing supported by a bearing on said shaft and adapted for mounting a cooling fan on its outer periphery, a cover closing said casing so that said casing and cover may define a closed housing, a driving disc secured about said shaft at one end thereof within said casing, a partition having an oil flow control hole and dividing the interior of said housing into an oil reservoir and a torque transfer chamber in which said disc is disposed, said housing defining at least one dam facing the outer periphery of said disc where oil is centrifugally collected, and an oil circulating passage connected to said dam and extending from said torque transfer chamber to said oil reservoir, a temperature sensor provided on the outside of said cover for detecting the ambient temperature prevailing around the coupling, and a valve member situated in said oil reservoir, operationally connected to said sensor, and having one end positioned to close said oil flow control hole, said valve member being deformable to open said hole if said temperature detected by said sensor exceeds a predetermined level, so that a torque transfer gap defined between the mutually facing surfaces of said disc and said housing may have a differently sized area of effective contact with oil to control the transfer of torque from said shaft to said housing to be thereby driven, the improvement wherein said disc has a cylindrical wall projecting in at least one axial direction at its outer periphery, and said disc, said projecting wall and said housing define at least one oil storage chamber, one of the free end of said projecting wall and the inner surface of said housing which faces it has an annular projection, while the other has an annular groove in which said projection is loosely fitted.

14. A coupling as set forth in claim 5, wherein said disc has a plurality of radially extending partitions on at least one side thereof, said radially extending partitions dividing at least one of said oil storage chambers into a plurality of portions.

15. A coupling as set forth in claim 14, wherein said disc has a plurality of holes formed near the roots of said radially extending partitions.

16. In a temperature sensitive fluid fan coupling which comprises a rotary shaft, a casing supported by a bearing on said shaft and adapted for mounting a cooling fan on its outer periphery, a cover closing said casing so that said casing and cover may define a closed housing, a driving disc secured about said shaft at one end thereof within said casing, a partition having an oil flow control hole and dividing the interior of said housing into an oil reservoir and a torque transfer chamber in which said disc is disposed, said housing defining at least one dam facing the outer periphery of said disc where oil is centrifugally collected, and an oil circulating passage connected to said dam and extending from said torque transfer chamber to said oil reservoir, a temperature sensor provided on the outside of said cover for detecting the ambient temperature prevailing around the coupling, and a valve member situated in said oil reservoir, operationally connected to said sensor, and having one end positioned to close said oil flow control hole, said valve member being deformable to open said hole if said temperature detected by said sensor exceeds a predetermined level, so that a torque transfer gap defined between the mutually facing surfaces of said disc and said housing may have a differently sized area of effective contact with oil to control the transfer of torque from said shaft to said housing to be thereby driven, the improvement wherein said disc has a cylindrical wall projecting in at least one axial direction at its outer periphery, said disc having an annular rib projecting radially inwardly from an inner surface of said projecting wall, and said disc, said projecting wall, said annular rib and said housing defining at least one oil storage chamber.

17. A coupling as set forth in claim 16, wherein at least one of said disc, said projecting wall thereof and said rib has a plurality of holes.

18. A coupling as set forth in claim 16, wherein said rib has a plurality of slits.

* * * * *